United States Patent [19]
Koide et al.

[11] Patent Number: 5,872,164
[45] Date of Patent: Feb. 16, 1999

[54] PROCESS FOR PREPARING RESIN COMPOSITION FOR COLORING AND A RESIN COMPOSITION FOR COLORING

[75] Inventors: Masashi Koide; Yasuaki Machida; Junichi Suzuki, all of Tokyo, Japan

[73] Assignee: Toyo Ink Manufacturing Co., Ltd., Tokyo, Japan

[21] Appl. No.: 933,640

[22] Filed: Sep. 19, 1997

Related U.S. Application Data

[63] Continuation of Ser. No. 545,689, filed as PCT/JP95/00295, Feb. 27, 1995, abandoned.

[30] Foreign Application Priority Data

| Feb. 25, 1994 | [JP] | Japan | 6-027759 |
| Mar. 11, 1994 | [JP] | Japan | 6-040764 |
| Mar. 11, 1994 | [JP] | Japan | 6-040765 |

[51] Int. Cl.$^6$ ........................................ C08J 3/20
[52] U.S. Cl. ................... 523/339; 523/351; 524/183; 524/265; 524/267; 524/269; 524/368; 524/376; 528/502 R; 264/211.18; 264/211.23
[58] Field of Search .................... 523/339, 351; 524/183, 265, 267, 269, 368, 376; 528/502 R; 264/211.18, 211.23

[56] References Cited

U.S. PATENT DOCUMENTS

| 5,213,934 | 5/1993 | Sacripante et al. | 430/109 |
| 5,236,645 | 8/1993 | Jones | 264/78 |
| 5,262,268 | 11/1993 | Bertrand et al. | 430/137 |
| 5,340,884 | 8/1994 | Mills et al. | 524/474 |
| 5,429,902 | 7/1995 | Saito et al. | 430/109 |

FOREIGN PATENT DOCUMENTS

| 53-34145 | 9/1978 | Japan . |
| 1126139 | 11/1984 | Japan . |
| 60-31857 | 7/1985 | Japan . |

*Primary Examiner*—Andrew E. C. Merriam
*Attorney, Agent, or Firm*—Knobbe Martens, Olson & Bear, LLP

[57] ABSTRACT

A process is provided for preparing a resin composition for coloring which comprises the steps of a phase replacement and dehydration of a pigment (a); water (b); a thermoplastic resin (c), an aqueous dispersion or solution of a thermoplastic resin (d) or an aqueous compound (e) in a twin screw extruder. Also, there is provided a resin composition for coloring prepared by such a process. It is possible to efficiently manufacture a resin composition for coloring (master batch) which has excellent pigment dispersibility and which is capable of uniform coloring without causing color unevenness.

10 Claims, No Drawings

PROCESS FOR PREPARING RESIN COMPOSITION FOR COLORING AND A RESIN COMPOSITION FOR COLORING

This application is a continuation of U.S. patent application Ser. No. 08/545,689, filed as PCT/JP95/00295, Feb. 27, 1995, now abandoned.

FIELD OF INDUSTRIAL APPLICATION

The present invention relates to a process for preparing a resin composition for coloring a thermoplastic resin and to such a resin composition.

BACKGROUND ART

Compositions for coloring a thermoplastic resin include a powdery dry color in which a pigment and a dispersant therefor are blended, a liquid color or paste color in which a pigment is dispersed in a dispersant which is liquid at ambient temperature, and a master batch in the form of pellets, flakes, or beads, in which a pigment is dispersed in a resin which is solid at ambient temperature. These coloring compositions are properly used in accordance with their use to make the most of their characteristics. Among them, master batches are used conventionally from the viewpoints of easiness in handling and preservation of the working environment during use. Therefore, master batches have nowadays come to require even higher pigment dispersibility and distribution properties than before as thermoplastic resins are molded more precisely and quicker, as well as have properties of high pigment concentrations and reduced influence upon various characteristics such as heat resistance and strength of the thermoplastic resins to be colored.

When a high level of pigment dispersion is required e.g., in cases where thermoplastic resins are spun at a high speed to a diameter of 10 and several microns or processed into films, it may happen that conventional pigment dispersibility of master batches is insufficient. That is, problems due to poor pigment dispersion occur, such as breakage of threads during spinning, plugging of filters of melt spinning machines, and shaping deficiency during filming. In order to solve these problems and improve the dispersibility of master batches, it is a conventional approach to use, as dispersants for providing dispersibility, one or more of stearic acid, zinc stearate, magnesium stearate, aluminum stearate, calcium stearate, lithium stearate, ethylene bisamide, polyethylene wax, polypropylene wax, or waxes composed of derivatives thereof, such as acid-denatured products. In addition, attempts have been made for improving methods of processing a master batch or for enhancing pigment dispersibility by use of a powerful kneader. However, sufficient pigment dispersibility to solve the above-mentioned problems was not obtained.

In addition, in the field of large-size injection molding in which colored pellets have conventionally been used, color unevenness and flow marks have become the problem in coloring molded products, as master batches are more frequently used for coloring. In blow molding and film forming in which master batches are conventionally used for coloring, plasticizing, blending, and kneading are all carried out in an extruder of the molding machine. On the other hand, in injection molding machine, plasticizing, blending, and kneading steps are carried out in a cylinder in which a screw may move back. However, kneading power in the cylinder is not sufficient as compared with extruders. Moreover, kneading power decreases, as molding cycle time is shortened and molding resins have lower viscosities. As a result, color unevenness tends to occur in the surface of resulting molded products.

In addition, a master batch comes to be added to a resin to be colored in reduced amounts after development of high concentration master batches in which the pigment content in master batches is increased so as to reduce costs needed for coloring. As a result, a chance that color unevenness and flow marks occur has increased. Although this problem is common among a variety of thermoplastic resins, it is especially outstanding in polypropylene resins which are frequently used in recent years in the fields of household appliances and automobile parts. Therefore, a solution of the problem is needed without delay. A conventional approach for solving this problem is one of increasing the amount of a dispersant among the three primary components of a master batch (a pigment, a dispersant, and a base resin), or of reducing the melt viscosity of a master batch by, for example, using a base resin which has a viscosity smaller than that of a resin to be colored.

However, polypropylene resins filled with inorganic fillers or having a melt flow rate (hereinafter referred to as MFR) in excess of 25 for facilitating a thin wall molding tend to generate color unevenness or flow marks. Therefore, this disadvantage must be overcome.

Conventionally, master batches are prepared by premixing a composition of a dry powdery pigment, a dispersant, and a base resin in a Henschel mixer, or the like, introducing the composition into a batch-type kneader such as a three roll mill or a kneader, melt-kneading it for a long time, pulverizing a resulting pigment dispersion using a crusher to a size that enables supply to a uniaxial extruder, and then by pelletizing them with the uniaxial extruder. However, since powdery pigment once dried contains numerous agglomerated particles including coarse secondary, tertiary, and higher grade cohesion particles, it is very difficult to re-disperse these coarse agglomerated particles at a size of not more than several micrometers. Moreover, the process is a batch-type and employs many steps, automation and reduction of labor are desired. In addition, improvement in a working environment in which dry pigments are scattered by the use of dry powdery pigments is also desired.

An object of the present invention is to overcome the above-mentioned various drawbacks and to provide an efficient process for preparing a resin composition (a master batch) for coloring a thermoplastic resin, which does not cause 5% or more decrease in mechanical strength of the thermoplastic resin, for example, tensile strength, bending strength, and impact strength thereof, which has excellent pigment dispersion ability, which is capable of providing a uniform coloring without causing color unevenness, the process providing a good working environment.

DESCRIPTION OF THE INVENTION

According to a first aspect of the present invention, there is provided a process for preparing a resin composition for coloring which comprises the steps of phase replacement and dehydration of a pigment (a), water (b), and a thermoplastic resin (c) in a twin screw extruder. Preferably, the pigment (a), water (b), and thermoplastic resin (c) are used in amounts from 0.01 to 90% by weight, 1 to 80% by weight, and 1 to 90% by weight, respectively.

According to a second aspect of the present invention, there is provided a process for preparing a resin composition for coloring which comprises the steps of phase replacement and dehydration of a pigment (a), a thermoplastic resin (c), and an aqueous dispersion or aqueous solution of a synthetic resin (d) in a twin screw extruder. Preferably, the pigment (a), thermoplastic resin (c), and the aqueous dispersion or aqueous solution of a synthetic resin (d) are used in amounts from 0.01 to 90% by weight, 1 to 90% by weight, and 0.01 to 80% by weight, respectively.

According to a third aspect of the present invention, there is provided a process for preparing a resin composition for coloring which comprises the steps of phase replacement and dehydration of a pigment (a), a thermoplastic resin (c), and an aqueous compound (e) in a twin screw extruder. Preferably, the pigment (a), thermoplastic resin (c), and the aqueous compound (e) are used in amounts from 0.01 to 90% by weight, 1 to 90% by weight, and 0.01 to 80% by weight, respectively.

The pigment (a) used in the present invention is either organic or inorganic, and no particular limitation is imposed on the kind of the pigment. As examples of the organic pigment, there are mentioned azo pigments, condensed azo pigments, phthalocyanine pigments, quinacridone pigments, indigo pigments, quinophthalone pigments, dioxane pigments, anthraquinone pigments, isoindolinone pigments, berylene pigments, and berynone pigments. As examples of inorganic pigments, there are mentioned cadmium sulfate, cadmium selenide, ultramarine, titanium dioxide, iron oxide, chromate oxide, and carbon black.

The pigment (a) may be in any form of a dry powder, wet cake containing water before submitted to a drying process, or a mixture of them.

When a dry powdery pigment is used, predetermined amounts of the dry powdery pigment, water, and a thermoplastic resin are premixed in a mixer such as a kneader or a Henschell mixer, after which the blended material is kneaded, using a twin screw extruder at a temperature at which the water evaporates and the thermoplastic resin melts. In this kneading step, the water by which the dry powdery pigments are wetted evaporates and the melt thermoplastic resin covers the pigments (phase replacement). A shear force during kneading finely divides the pigments, and the surfaces of the resulting powder is covered with a thermoplastic resin. As a result, cohesion of pigment particles is prevented. Therefore, a resin composition having an excellent ability to disperse pigments can be obtained.

According to the present invention, since water is added to a mixture of a dry powdery pigment and a thermoplastic resin, the bulk density if the resulting mixture increases. In other words, the distance between the dry powdery pigment and the thermoplastic resin decreases to effectively proceed association of them during kneading. As a result, the dry powdery pigment is wetted by the thermoplastic resin more extensively to reduce the amount of re-agglomerating pigment particles. It is considered that a resin composition having an excellent pigment dispersion ability is obtained by this mechanism. Moreover, the fact that water spreads into agglomerated pigment to loosen them is also considered to contribute to the improvement in pigment dispersion.

The water (b) may be any type, for example, tap water, distilled water, ion-exchange water, or water for industrial use. However, it is preferred that the water contains no substances that affect the use of the resin composition, such as coarse particles, dissolved matters, and ions. The water may be added in an amount from 1 to 80% by weight, and more preferably from 20 to 60% by weight. If the amount is less than 1%, the bulk density of a mixture of the dry powdery pigment and the thermoplastic resin is almost the same as in the case in which water is not added. Thus, only a small dispersion effect is expected. On the other hand, if the amount of water is in excess of 80% by weight, the process will become inefficient due to requiring considerable time and energy in the dehydration step.

When wet cakes of pigment are used as the pigment (a), a predetermined amount of the wet cakes and a thermoplastic resin are premixed in a mixer such as a kneader or a Henschell mixer, after which the blended material is kneaded, using a twin screw extruder at a temperature at which the water evaporates and the thermoplastic resin melts. In this kneading step, the water contained in the wet pigment cakes evaporates and the melt thermoplastic resin covers the pigments (phase replacement). A shear force during kneading finely divides the pigments, and the surfaces of the resulting powder are covered with a thermoplastic resin. As a result, cohesion of pigment particles is prevented, and thus a resin composition having an excellent ability to disperse pigments can be obtained.

According to the present invention, the wet pigment cakes which contain water and which have not undergone a drying step are composed of pigment particles close or akin to primary particles, and contain reduced amounts of agglomerated particles. Since a pigment dispersion is prepared by flushing these wet cakes from an aqueous phase into a resin phase by use of thermoplastic resin, pigment particles close to primary particles are retained. It is considered that a resin composition having an excellent pigment dispersion ability is obtained by this mechanism.

The wet pigment cakes contain 1 to 80% by weight of water while the primary pigment particles are kept in a substantially non-cohesive state. As the water content decreases, primary particles of the pigment tend to agglomerate. In contrast, as the water content increases, considerable time and energy are needed in the phase replacement step and the dehydration step. Therefore, it is preferred that the water content in pigment wet cakes be from 20 to 60% by weight. As to the non-cohesive state of the primary particles of pigment, every particle does not have to be completely independent, and it is sufficient if excessive local dehydration or accompanying agglomeration is suppressed. Thus, a part of primary particles may be agglomerated.

The wet pigment cake may contain a dry powdery pigment. The water content in a mixture of the wet pigment cake and the dry powdery pigment is from 1 to 80% by weight.

The thermoplastic resin (c) is preferably compatible with a resin to be colored and has an MFR in a range from 0.1 to 400, more particularly from 10 to 250. If the MFR is less than 0.1, compatibility with a resin to be colored decreases, causing color unevenness and adversely affecting various characteristics of the colored thermoplastic resin. On the other hand, if MFR is in excess of 400, mechanical strength and heat resistance of the resin composition itself decrease. As a result, manufacture of the resin composition becomes difficult, and in addition, various characteristics of the thermoplastic resin to be colored, such as heat resistance and strength are adversely affected. In this connection, MFR is intended to mean MFR values measured in accordance with JIS K7210. See English translation of JIS K7210, JIS Handbook 1993 Plastics (printed Jul. 15, 1993), Japanese Standards Association, pages 780–794. Namely, MFR is calculated as the mass (g) of the sample extruded in 10 minutes using an extrusion type plastometer under the test conditions shown below, depending on the type of resin (Tables 1 and 2 on page 784 of JIS Handbook).

| Test Conditions | | |
|---|---|---|
| No. | Tem °C. | Load kgf |
| 1 | 125 | 0.325 |
| 2 | 150 | 2.16 |
| 3 | 190 | 0.325 |
| 4 | 190 | 2.16 |
| 5 | 190 | 5.00 |
| 6 | 190 | 10.00 |
| 7 | 190 | 21.60 |
| 8 | 200 | 5.00 |
| 9 | 200 | 10.00 |
| 10 | 210 | 10.00 |
| 11 | 220 | 10.00 |
| 12 | 230 | 0.325 |
| 13 | 230 | 1.200 |
| 14 | 230 | 2.16 |
| 15 | 230 | 3.30 |
| 16 | 230 | 5.00 |
| 17 | 230 | 10.00 |
| 18 | 275 | 0.325 |
| 19 | 275 | 2.16 |
| 20 | 280 | 2.16 |
| 21 | 300 | 1.20 |

| Generally Used Test Conditions for Respective Resins | |
|---|---|
| Resin | Applicable Conditions |
| Polyethylene | 1, 3, 4, 5, 6, 7 |
| Ethylene-vinyl acetate resin | 1, 2, 3, 4 |
| Polypropylene | 4, 6, 14, 16, 17 |
| Polyacetal | 4 |
| Cellulose acetate | 4 |
| Polystyrene | 6, 8, 13, 15 |
| ABS resin | 8, 11, 15 |
| Acrylic resin | 9, 10, 13, 14, 15, 17 |
| Polyamide | 4, 12, 14, 18, 19 |
| Polycarbonate | 20, 21 |

Specific examples of the thermoplastic resin (c) include polyolefin resins, such as crystalline or amorphous polypropylenes containing a trace amount of diene, low-density or high-density polyethylenes, random, block, or graft copolymers of ethylene propylene, copolymers of α-olefin and ethylene or propylene, ethylene.vinyl acetate copolymers, ethylene.methyl acrylate copolymers, ethylene.ethyl acrylate copolymers, ethylene.acrylic acid copolymers, and low degree polymerization polymers and waxes obtained from a thermal cracking of these resins. They are used singly or in combination of two or more.

Besides the polyolefin resins, the following thermoplastic resins can be used: Polymethylpentenes, polystyrenes, polyvinyl chlorides, polyethylene terephthalates, polybutylene terephthalates of a polydiene type, acrylonitrile-butadient-styrene (ABS) resins, acrylonitrile-EPDM-styrene (AES) resins, and in addition, acrylic resins, polyamides, polycarbonates, polyacetals, and polyurethanes. They are used singly or in combination of two or more.

The thermoplastic resins may be derivatives obtained from a modification of functional groups, cross-linking, or a grafting or block-forming modification. They may be in the form of powder or pellets.

In the second aspect of the invention, the pigment dispersing ability is significantly enhanced by the incorporation of an aqueous dispersion or an aqueous solution of a synthetic resin (d). This effect is considered to be caused from a synergism of water (b) and the synthetic resin. The effect of the water was already described herein. The effect resulted from the synthetic resin which has been dissolved or dispersed in water is attributed to the affinity of the resin having at least one polar functional group for the pigment. Since the polar functional groups are present in the aqueous solution as part of molecules, polar bonds tend to be formed together with the pigment, and the bonds are embraced by a hydrophobic part of the thermoplastic resin to establish a structure like a protective colloid. It is thought that cohesion of pigment particles is reduced so that the dispersibility of the pigment will be enhanced by this mechanism.

The aqueous dispersion or aqueous solution of a synthetic resin, component (d), can be readily prepared in a dispersed state or dissolved state, optionally by neutralizing the synthetic resin with a neutralizer, and by diluting with water. The solid content in the aqueous dispersion or aqueous solution of a synthetic resin (d) is from 0.01 to 80% by weight, and more preferably from 1 to 65% by weight.

The synthetic resin may be any type as long as it is compatible with the resin to be colored. For example, thermoplastic resins with polarity and thermosetting resins with polarity are used. Particularly, thermoplastic resins containing polar functional groups are preferred. No particular limitation is imposed on the type of the polar functional groups. As examples of the polar functional groups, there are mentioned monobasic and dibaseic acids and anhydrides thereof, a glycidyl group, a hydroxyl group, an amino group, an amido group, an ethyleneimine group, an isocyanate group, and an alkylene oxide-bonding group, all of which can form an aqueous substance.

In carboxyl group-containing thermoplastic resins among the thermoplastic resins with polar functional groups, the acid value is an important factor. Preferably, carboxyl group-containing thermoplastic resins have an acid value from 5 to 600, and more preferably from 50 to 500. If the acid value is less than 5, the resins are difficult to be dissolved or dispersed in water. Moreover, satisfactory pigment dispersion ability and color developing ability are difficult to obtain. In addition, molded products which have been colored tend to have color unevenness and flow marks. Furthermore, if the acid value is in excess of 600, the resins readily absorb moisture to cause silver streaks in the surface of a molded product or emit smoke, and in addition, weatherability and heat resistance are adversely affected.

As examples of polyolefin resins among polar functional group-containing thermoplastic resins, there are used crystalline or amorphous polypropylenes, polybutene-1, polypentene-1, poly 4-methylpentene-1, low-density or high-density polyethylenes, random, block, or graft copolymers of ethylene.propylene, copolymers of α-olefin and ethylene or propylene, ethylene.vinyl acetate copolymers, ethylene.methyl acrylate copolymers, ethylene.ethyl acrylate copolymers, or ethylene.methyl methacrylate copolymers, to which functional groups are introduced. Furthermore, there are used ethylene.acrylic acid copolymers, ethylene.methacrylic acid copolymers, ethylene.maleic anhydride copolymers, propylene.acrylic acid copolymers, or copolymers of a functional group-containing monomer and a monomer having an α,β-unsaturated double bond such as an α-olefin, diolefin, allyl monomer, N-vinyl monomer, vinyl ether, vinyl sulfide, or a (meth)acrylate monomer. They are used singly or in combination of two or more.

Examples of the α-olefin include ethylene, propylene, butylene, isobutylene, pentene, 1-hexene, 1-heptene, 1-octene, 1-nonene, 1-decene, 1-dodecene, 1-tetradecene, 1-hexadecene, 1-octadecene, 1-eicosene, 1-docosene, 1-tetracosene, 1-hexacosene, 1-octacosene, 1-triacontane, 1-detriacontane, 1-tetratriacontane, 1-hexatriacontane, 1-octatriacontane, and 1-tetracontane. Examples of commercially available products include "Diaren 208" (C20–C28) and "Diaren 30" (C30 or more carbon atoms), which are manufactured by Mitsubishi Chemical Industries Ltd., and "VYBER260" (C30 or more carbon atoms) manufactured by Petrolite Co.

Examples of the diolefin include butadiene, isoprene, neoprene, and chloroprene.

Examples of the allyl monomer include allyl acetate, isopropenyl acetate, allyl chloride, isopropenyl chloride, trans-propenyl chloride, and cis-propenyl chloride.

Examples of the N-vinyl monomer include N-vinyl carbazole, N-vinyl-2-pyrrolidone, and N-vinyl phthalimide.

Examples of the vinyl ether include linear or branched aliphatic alkyl vinyl ethers such as ethyl vinyl ether, propyl vinyl ether, isobutyl vinyl ether, and hexyl vinyl ether, and p-dioxene.

Examples of the vinyl sulfide include ethyl vinyl sulfide, and phenyl vinyl sulfide.

Examples of the (meth)acrylate monomer include acrylic esters or a corresponding methacrylic acid esters of a linear or branched aliphatic alcohol, such as methyl acrylate, ethyl acrylate, butyl acrylate, hexyl acrylate, octyl acrylate, 2-ethylhexyl acrylate, decyl acrylate, and dodecyl acrylate.

Moreover, other copolymerizable vinyl monomers include vinyl esters, vinyl pyrridine, vinyl acetate, vinyl propionate, styrene, α-methyl styrene, β-methyl styrene, acrylonitrile, methacrylonitrile, and vinylidene chloride.

As examples of the functional group-containing monomer, there are mentioned monobasic or dibasic acids having an unsaturated group and their anhydrides, such as acrylic acid, methacrylic acid, maleic acid, fumaric acid, itaconic acid, tetrahydrophthalic acid, crotonic acid, citraconic acid, hymic acid, allylsuccinic acid, mesaconic acid, glutaconic acid, tetrahydrophthalic acid, methylhexahydrophthalic acid, aconitic acid, maleic anhydride, itaconic anhydride, citraconic anhydride, hymic anhydride, allylsuccinic anhydride, glutaconic anhydride, tetrahydrophthalic anhydride, methylhexahydrophthalic anhydride, and aconitic anhydride.

Moreover, there are mentioned glycidyl group-containing monomers such as glycidyl acrylate, glycidyl methacrylate, maleic acid diglycidyl esters, maleic acid methyl glycidyl esters, maleic acid isopropyl glycidyl esters, maleic acid t-buty glycidyl esters, fumaric acid diglycidyl esters, fumaric acid isopropyl glycidyl esters, itaconic acid diglycidyl esters, itaconic acid methyl glycidyl esters, itaconic acid isopropyl glycidyl esters, 2-methylene glutanic acid diglycidyl esters, 2-methylene glutanic acid methyl glycidyl esters, butene dicarboxylic acid monogycidyl esters, 3,4-epoxybutene, 3,4-epoxy-3-methyl-1-butene, vinylcyclohexene monoxide, and p-glycidyl styrene.

Furthermore, there are mentioned monomers containing an amino group or amide group such as N-methylol acrylamide, N-methylol methacrylamide, N-methylaminoethyl acrylate, N-tributylaminoethyl acrylate, N,N-dimethylaminoethyl acrylate, N,N-dimethylaminoethyl methacrylate, N,N-diethylaminoethyl methacrylate, acrylic amide, methacrylic amide, N-butoxymethyl acrylic amide, N-methoxymethyl acrylic amide, allyl amine, dimethylaminopropyl methacrylamide, diallylamine, triallyl amine, 4-vinylpyrridine, 2-methyl-6-vinylpyrridine, 4-butenylpyrridine, and vinylpyrrolidone.

In addition, there are mentioned monomers containing a hydroxyl group such as 2-hydroxyethyl acrylate, 2-hydroxypropyl acrylate, 2-hydroxyethyl methacrylate, 2-hydroxypropyl methacrylate, polyethylene glycol acrylate, polyethylene glycol methacrylate, mono-(2-hydroxyethyl-α-chloroacrylate)acid phosphate, and monomers containing an ethyleneimine group or an isocyanate group such as 2-(1-aziridinyl)ethyl methacrylate, and ethyl isocyanate methacrylate.

At least one of these monomers is used as the functional group-containing monomer. Among these monomers, acrylic acid and maleic anhydride are industrially advantageous, and easily dissolved or dispersed in water.

Besides the polyolefin resins, there are mentioned aliphatic esters such as long chain esters of lauric acid, myristic acid, palmitic acid, stearic acid, palmitoleic acid, oleic acid, linolic acid, and linoleic acid, aliphatic esters such as glycerol esters; and thermoplastic resins (such as polyvinyl chloride, polyethylene terephthalate, polybutylene terephthalate, acrylonitrile-butadiene-styrene (ABS) resins, acrylonitrile-EPDM-styrene (AES) resins, acrylic resins, polyamides, polycarbonates, polyacetals, or polyurethanes) to which a polar functional group has been introduced while a functional group necessary for water-dissolution or dispersion remains. They are used singly or in combination of two or more.

A synthetic resin can be easily dispersed or dissolved in water by neutralizing the functional moiety in a polar functional group-containing thermoplastic resin by use of an organic acid, inorganic acid, hydroxide, organic amine, or the like as a neutralizer, and by diluting with water. Examples of the neutralizer include acetic acid, hydrochloric acid, sulfuric acid, nitric acid, phosphoric acid, boric acid, sodium hydroxide, potassium hydroxide, lithium hydroxide, ammonia water, monoethanolamine, N-methylethanolamine, N,N-dimethylethanolamine, triethylamine, and triethanolamine. Surfactants can also be used.

In the third aspect of the invention, the pigment dispersing ability is significantly enhanced by the incorporation of an aqueous compound (e). This effect is sufficient to be considered to be caused from a synergism of water (b) and the aqueous compound (e).

The aqueous compound (e) is a water-soluble or water-dispersible compound and is compatible with a resin to be colored. The aqueous compound (e) can be used as an aqueous solution or an aqueous dispersion which contains 0.01 to 80% by weight, preferably 1 to 65% by weight, of a solid substance. As examples of aqueous compound (e), there are mentioned boric esters, phosphoric esters, organic silicon compounds having a hydrophilic group, and organic fluorine compounds having a hydrophilic group. They are used singly or in combination of two or more. Particularly, those having a high compatibility with pigment particles and surface activity are preferably used. Ordinary surfactants may also be used.

the boric esters and phosphoric esters are esters between boric acid or phosphoric acid and an alcohol. They may be mono-, di-, or tri-esters or mixtures thereof.

Examples of the alcohol include polyols, monoalcohols, derivatives such as alkyleneoxide adducts of these alcohols, and oxyacids. Particularly, polyols such as glycols and glycerols having an adjacent OH group, as well as alkylene oxide adducts of these alcohols, are preferred.

Examples of the polyols include 1,3-butylene glycol, tetramethylene glycol, neopentyl glycol, hexamethylene glycol, diethylene glycol, propylene glycol, dipropylene glycol, triethylene glycol, poly(ethylene ether)glycol, poly (propylene ether)glycol, poly(tetramethylene ether)glycol, polyformal glycol, copolymers of ethylene oxide and propylene oxide, hydrogenated bisphenol A, trimethylol propane, tris(hydroxyethyl)isocyanate, glycerol, glycerol monolaurate, glycerol monopalmitate, glycerol monostearate, diglycerol monostearate, glycerol monooleate, polyoxyethylene glycerol stearate, and sorbitol.

Examples of the monoalcohols include methyl alcohol, ethyl alcohol, propyl alcohol, butyl alcohol, hexyl alcohol, octyl alcohol, decyl alcohol, dodecyl alcohol, tetracosyl alcohol, hexacosyl alcohol, octadecenyl alcohol, cyclohexyl alcohol, oleyl alcohol, palmityl alcohol, isostearyl alcohol, and benzyl alcohol.

Examples of the oxyacids include 12-hydroxystearic acid, linosinic acid, caster oil fatty acids, hydrogenated castor oil fatty acids, delta-hydroxyvaleric acid, ε-hydroxycaproic acid, and p-hydroxyethyloxybenzoic acid.

Among the aqueous compounds, the organic silicon compounds having a hydrophilic group are those of the nonionic type, for example, in which polyalkylene oxide is added to a methylpolysiloxane, those of the cationic type such as acid-neutralized products of amino-modified methylpolysiloxane, and those of the anionic type such as products of acid-modified methylpolysiloxane neutralized with a basic substance. Among them, nonionic type compounds are preferred. Specifically, the side chain-modified organic silicon compounds represented by the following formula (1) and terminal-modified organic silicon compounds represented by the following formula (2) are mentioned.

Side chain-modified type:

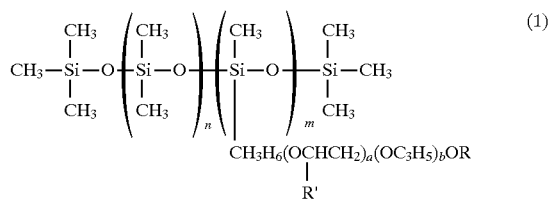

Terminal-modified type:

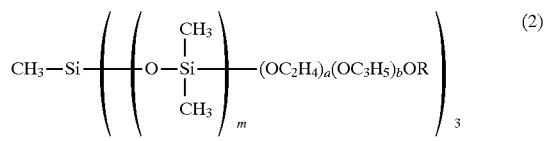

wherein m, n, a, and b are arbitrary integers, R is a hydrogen atom or an alkyl group, R' is a hydrogen atom or a methyl group.

Among the aqueous compounds, organic fluorine-containing compounds having a hydrophilic group have a fluoroalkyl group ($CF_3$—($CF_2$)m—) in the molecule, and exhibit a very low surface tension. As examples of the organic fluorine-containing compounds having a hydrophilic group, there are mentioned anionic-type compounds having a carboxylic acid salt, sulfonic acid salt, or a phosphoric acid ester as the hydrophilic moiety; cationic-type compounds such as trimethylammonium salts; amphoteric-type compounds such as alkyl betaine and alkylaminosulfonic acid salts; and nonionic-type compounds such as polyalkylene oxide adducts.

There are several types of screw extruders which include uniaxial extruders, twin screw extruders, and multi-screw extruders. Uniaxial extruders and multi-screw extruders have the following disadvantages, when a resin composition for coloring is intended to be manufactured in a continuous manner. With a uniaxial extruder, materials to be processed in the extruder cannot be transferred stably, and in addition, due to a low kneadability in the phase replacement step, pigments and thermoplastic resins cannot be associated effectively. Multi-screw extruders have a too complicated structure, although in many cases they provide effects as well as or better than those twin screw extruders. In addition, though apparatus-cost rises sharply, improvement in advantageous effects that is commensurate with the rise cannot be expected. Therefore, a twin screw extruder is used in the present invention.

The screws in the twin screw extruder preferably rotate in the same direction, which provides excellent kneading. The L/D value of the screws is preferably 25 or more, and more preferably 30 or more. The L/D value less than 25 results in insufficient kneading and a poor quality.

the shape of the screw is not particularly limited. However, it is preferred that screw elements be arranged so that strong kneading is effected. The screw speed is an important factor in a twin screw extruder, which should be determined taking account of the speed of phase replacement. Although the screw speed differs depending on the L/D value and the shape of the screw, it is preferably from 150 to 450 rpm in order to improve the mixing and kneading effects to achieve a high speed operation.

The temperature to be set for the twin screw extruder is not particularly limited. It is important that each barrel is cooled or heated according to characteristics of the pigment which is used and a melt characteristic of the thermoplastic resin. A vent port connected to a vacuum pump can be disposed in the twin screw extruder to achieve effective dehydration. Moreover, dehydration may be carried out with heat and reduced pressure, if necessary.

In the process for manufacturing a resin composition for coloring according to the present invention, kneaders and three roll mills may also be suggested as processing apparatuses other than the twin screw extruder. However, it is difficult to complete the phase replacement step and dehydration step in a short period. If dehydration is insufficient, problems such as supply deficiency and breakage of strands occur in a post processing step of making pellets in an uniaxial extruder. In contrast, when a twin screw extruder is used, a high dehydration efficiency is obtained. Therefore, it is possible to continuously effect a series of processes in the same extruder and obtain a variety of resin products for coloring, as final products at a high speed.

Various additives may be added to the resin composition for coloring a thermoplastic resin according to the present invention as long as the advantageous effect of the invention is not impeded. Such additives include antioxidants, UV absorbers, stabilizers, plasticizers, antistatic agents, flame retardants, fillers, reinforcing materials, coupling agents, and nucleus forming agents.

The resin composition for coloring a thermoplastic resin according to the present invention is capable of coloring almost all kinds of thermoplastic resins including those containing reinforcing materials such as inorganic fillers, glass fibers, and organic fibers in an attempt for improving their properties. For example, although conventional resin compositions are not able to provide uniform coloring without affecting mechanical properties such as strength or heat resistance, the present invention makes it possible to achieve uniform coloring without color unevenness by use of the resin composition of the present invention in an small amount of not more than 4 parts by weight with respect to 100 parts by weight of a thermoplastic resin containing an inorganic filler or a fiber reinforcing material in an amount of at most 50% by weight.

The resin composition for coloring according to the present invention can be incorporated into thermoplastic resins such as polyolefin resins, polymethyl pentenes, polystyrenes, polyvinyl chlorides, polyethylene terephthalates, polybutylene terephthalates, acrylonitrilebutadiene-styrene (ABS) resins, acrylonitrile-EPDM-styrene (AES) resins, acrylic resins, polyamides, polycarbonates, polyacetals, and polyurethanes.

The resin composition for coloring can also be used in the fields of ink, paints, and adhesives.

EXAMPLES

The present invention will next be described specifically by way of examples. In the examples, parts and % are intended to mean parts by weight and % by weight, respectively. Regarding aqueous dispersions and solutions (d), processes for manufacture are described.

(Preparation Example 1)

200 parts of a polyoxyethylene oxide adduct of polyolefin, "Unitox 480" (manufactured by Petrolite), was dissolved in 800 parts of water to obtain an aqueous resin solution with a solid content of 20%.

(Preparation Example 2)

838.7 parts of polyethylene wax "Sunwax 171P" (manufactured by Sanyo Chemical Industries, Ltd.), 4.6 parts of 2,5-dimethyl-2,5-di-t-butylperoxyhexyne-3 "Perhexyne 25B" (manufactured by Nippon Oil and Fats Co., Ltd.), and 10 parts of toluene were charged in a flask, and air was purged by introducing a nitrogen gas. Subsequently, while heating with stirring the content of the flask at 80° C., 161.3 parts of acrylic acid was added dropwise over 1 hour and 5.0 parts of 2,5-dimethyl-2,5-di-t-butylperoxyhexyne-3 "Perhexyne 25B" was added dropwise over 1 hour. After completion of addition, the temperature of the system was maintained at 200° C., and reaction was allowed to proceed for further 6 hours. When the reaction terminated, the content was taken out of the flask while hot, followed by cooling and solidifying. A resin with an acid value of 143 was obtained. 30 parts of the obtained resin, 70 parts of water, and 15 parts of potassium hydroxide were charged in a flask, followed by stirring for 2 hours at 95° C., to obtain an aqueous resin dispersion with a pH of 7.9 and a solid content of 29.8%.

(Preparation Example 3)

600 parts of an ethylene.α-olefin.maleic anhydride copolymer "Rucant A-6002" (manufactured by Mitsui Petrochemical Industries, Ltd.), 400 parts of water, and 38 parts of potassium hydroxide were charged in a flask, and air was purged by introducing a nitrogen gas. Subsequently, the content of the flask was heated and stirred for 2 hours at 95° C., to obtain an aqueous resin dispersion with a solid content of 59.8%.

(Preparation Example 4)

757.4 parts of octadecene, 2.7 parts of di-t-butylperoxide, and 10 parts of toluene were charged in a flask, and air was purged by introducing a nitrogen gas. Subsequently, the content of the flask was heated and stirred at 150° C., during which 294.2 parts of maleic anhydride was added, in amounts of respective 9.8 parts at the intervals of 2 minutes, and 2.1 parts of di-t-butylperoxide was added, in amounts of respective 0.7 parts at the intervals of 20 minutes. After completion of addition, the temperature of the system was maintained at 160° C., and reaction was allowed to proceed for further 6 hours. When the reaction terminated, the content was taken out of the flask while hot, followed by cooling and solidifying. A resin with an acid value of 320 was obtained. 30 parts of the obtained resin, 70 parts of water, and 12.5 parts of ammonia water (28%) were charged in a flask, followed by stirring for 2 hours at 70° C., to obtain an aqueous resin dispersion with a pH of 7.9 and a solid content of 29.7%.

[Example 1]

Polyethylene "NUC G5391" (manufactured by Nippon Unicar, MFR: 50) 60 parts

Phthalocyanine Blue "Lionol Blue 7110V" (manufactured by Toyo Ink Mfg. Co., Ltd. 40 parts Tap water 40 parts The above three ingredients were premixed in a Henschel mixer, and kneaded for about 3 minutes, with a twin screw extruder rotating in the same direction "PCM-30" (manufactured by Ikegai Corporation) with a screw diameter of 30 mm and an L/D value of 42, under conditions of 350 rpm and 140° C., and extruded. Subsequently, the extruded compound was cut with a pelletizer to obtain a master batch. The whole process proceeded smoothly, so that no breakage of strands or pulsating flows occurred. Next, 100 parts of a polypropylene "Mitsui Nobrene J400" (manufactured by Mitsui Petrochemical Industries, Ltd., MFR: 3) and 3 parts of the obtained master batch were mixed. The mixture was spun with a vertical spinning machine for testing. "Spinning Tester" (manufactured by Fuji Filter Co.) while the temperature under the hopper was set at 230° C. and the temperatures at the kneading section and dice section were both set at 230° C., after which the resulting threads were stretched with a draw ratio of 3 to obtain polypropylene fibers of 5 deniers. Good dispersibility was obtained without causing any problem in spinnability, generation of clogging, and stretching.

[Comparative Example 1]

The procedure of Example 1 was repeated except that tap water was not used, to obtain a master batch. The whole process proceeded smoothly, so that no breakage of strands or pulsating flows occurred. Spinning was carried out in a manner similar to that described in Example 1. Breakage of threads occurred.

[Comparative Example 2]

The three ingredients described in Example 1 were premixed, and kneaded with a three roll mill at 140° C. for about 10 minutes. The kneaded material was cooled and pulverized, and then subjected to a pelletizing step using a uniaxial extruder having a screw diameter of 65 mm. Since dehydration was insufficient, supply deficiency occurred to cause breakage of strands and pulsating flows. As a result, master batches could not be obtained.

[Example 2]

Polyethylene "Mitsubishi Polyechi MV31" (manufactured by Mitsubishi Petrochemical Co., Ltd., MFR: 45) 50 parts Polyethylene wax "Sunwax 165P" (manufactured by Sanyo Chemical Industries, Ltd.) 10 parts Phthalocyanine Blue wet cake "Lionol Blue SM-P" (manufactured by Toyo Ink Mfg. Co., Ltd., (pigment concentration: 50.0%) 80 parts The above three ingredients were processed in a manner similar to that described in Example 1 to give a master batch smoothly without causing breakage of strands or pulsating flows. Spinning was carried out as as in Example 1 to obtain polypropylene fibers. Good dispersibility was obtained without causing any problem in spinnability, generation of clogging, and stretching.

[Comparative Example 3]

The procedure of Example 2 was repeated except that 40 parts of Phthalocyanine Blue "Lionol Blue POBS" (manufactured by Toyo Ink Mfg. Co., Ltd.) in the form of dry powder were used instead of Phthalocyanine Blue wet cake "Lionol Blue SM-P", to obtain a master batch smoothly without causing breakage of strands or pulsating flows. Spinning was carried out as in Example 1. Breakage of threads due to clogging occurred.

[Comparative Example 4]

The three ingredients of the composition described in Example 2 were premixed, and kneaded with a kneader at 140° C. for about 10 minutes. The kneaded material was cooled and pulverized, and then subjected to a pelletizing step using a uniaxial extruder having a screw diameter of 65 mm. However, dehydration was insufficient, and thus supply deficiency occurred to cause breakage of strands and pulsating flows. As a result, master batches could not be obtained.

[Example 3]

Propylene/ethylene block copolymer "Mitsui Nobrene J740P" (MFR: 25) (manufactured by Mitsui Petrochemical Industries, Ltd.) 59 parts Magnesium stearate 1 part Phthalocyanine Blue "Lionol Blue FG7330" (manufactured by Toyo Ink Mfg. Co., Ltd. 15 parts Phthalocyanine Blue wet cake "Lionol Blue FG7334P" (pigment concentration: 50.0%) (manufactured by Toyo Ink Mfg. Co., Ltd.) 50 parts The above four ingredients were processed in a manner similar to that described in Example 1 except that the temperature set for the twin screw extruder was 180° C. A master batch was obtained smoothly without causing breakage of strands or pulsating flows. Spinning was carried out as in Example 1 to obtain polypropylene fibers. Good dispersibility was obtained without causing any problem in spinnability, generation of clogging; and stretching.

[Comparative Example 5]

The procedure of Example 3 was repeated except that 25 parts of Phthalocyanine Blue "Lionol Blue PG7330" were used instead of 50 parts of Phthalocyanine Blue wet cake "Lionol Blue FG7334P", to obtain a master batch smoothly without causing breakage of strands or pulsating flows. Spinning was carried out as in Example 1. Breakage of threads due to clogging occurred.

[Comparative Example 6]

The four ingredients of the composition described in Example 3 were premixed and the procedure of Comparative Example 4 was repeated in an attempt for obtaining a master batch, except that the temperature of the kneader was 180° C. However, dehydration was insufficient, and thus supply deficiency occurred to cause breakage of strands and pulsating flows. As a result, master batches could not be obtained.

[Example 4]

Polypropylene "Hipole J800P" (MFR: 25) (manufactured by Mitsui Petrochemical Industries, Ltd.) 45 parts Polypropylene wax "Viscol 660P" (manufactured by Sanyo Chemical Industries, Ltd.) 10 parts Quinacridone Red "Fastgene Super Magenta RE03" (manufactured by Dainippon Ink and Chemicals, Inc.) 45 parts Water for industrial use 30 parts The above four ingredients were processed in a manner similar to that described in Example 3 to obtain a master batch smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 7]

The procedure of Example 4 was repeated excepting that water for industrial use was eliminated to obtain a master batch smoothly without causing breakage of strands or pulsating flows. Spinning was carried out as in Example 1. Breakage of threads due to clogging occurred.

[Comparative Example 8]

The four ingredients of the composition described in Example 4 were premixed and the procedure of Comparative Example 6 was repeated in an attempt for obtaining a master batch. However, dehydration was insufficient, and thus supply deficiency occurred to cause breakage of strands and a pulsating flow. As a result, master batches could not be obtained.

[Example 5]

27% aqueous dispersion of an ethylene methacrylic acid copolymer "Chemipearl S-650" (manufactured by Mitsui Petrochemical Industries, Ltd.) 74 parts Polyethylene "NUC G5391" 40 parts Phthalocyanine Blue "Lionol Blue 7110V" 40 parts The above three ingredients were processed in a manner similar to that described in Example 1 to give a master batch smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 9]

The procedure of Example 5 was repeated excepting 20 parts of a polypropylene wax "Viscol 550P" (manufactured by Sanyo Chemical Industries, Ltd.) were used instead of 74 parts of "Chemipearl S-650" to obtain a master batch. The process proceeded smoothly without causing breakage of strands or pulsating flows. Spinning was carried out as in Example 1. Breakage of threads due to clogging occurred.

[Comparative Example 10]

The three ingredients of the composition described in Example 5 were premixed and the procedure of Comparative Example 2 was repeated in an attempt for obtaining a master batch. However, dehydration was insufficient, and thus supply deficiency occurred to cause breakage of strands and pulsating flows. As a result, master batches could not be obtained.

[Example 6]

Aqueous resin solution obtained in Preparation Example 1 100 parts

Propylene/ethylene block copolymer "Mitsui Nobrene J740P" 35 parts

Quinacridone Red "Fastgene Super Magenta RE03" 45 parts

The above three ingredients were processed in a manner similar to that described in Example 3 to obtain a master batch smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 11]

The procedure of Example 6 was repeated excepting that 20 parts of a polymerized rosin ester "Pentarin CJ" (manufactured by Rika Hercules) were used instead of 100 parts of the aqueous resin solution obtained in Preparation Example 1 to obtain a master batch. The process proceeded smoothly without causing breakage of strands or pulsating flows. Spinning was carried out as in Example 1. Breakage of threads due to clogging occurred.

[Comparative Example 12]

The three ingredients of the composition described in Example 6 were premixed and the procedure of Comparative Example 6 was repeated in an attempt for obtaining a master batch. However, dehydration was insufficient, so that supply deficiency occurred to cause breakage of strands and pulsating flows. As a result, master batches could not be obtained.

[Example 7]

Aqueous resin dispersion obtained in Preparation Example 2 50.3 parts

Polyethylene "NUC G5391" (MFR: 50) 50 parts

Phthalocyanine Blue wet cake "Lionol Blue FG7334P" (pigment concentration: 50.0%) 70 parts The above three ingredients were processed in a manner similar to that described in Example 1 to obtain a master batch smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 13]

The procedure of Example 7 was repeated except that 15 parts of a polypropylene was "Biscol 550P" were used instead of 50.3 parts of the aqueous resin dispersion obtained in Preparation Example 2, and 35 parts of Phthalocyanine Blue "Lionol Blue FG7330" (manufactured by Toyo Ink Mfg. Co., Ltd.) were used instead of 70 pats of the Phthalocyanine Blue wet cake "Lionol Blue FG7334P" to obtain a master batch. The process proceeded smoothly without causing breakage of strands or pulsating flows. Spinning was carried out as in Example 1. Breakage of threads due to clogging occurred.

[Comparative Example 14]

The three ingredients of the composition described in Example 7 were premixed and the procedure of Comparative Example 2 was repeated in an attempt for obtaining a master batch. However, dehydration was insufficient, and thus supply deficiency occurred to cause breakage of strands and pulsating flows. As a result, master batches could not be obtained.

[Example 8]

30% aqueous dispersion of a resin emulsion of a crystalline polypropylene type, Hitech E-433N (manufactured by Toho Chemical Industry Co., Ltd.) 33.3 parts Polypropylene "Hipole J800P" (MFR: 25) 45 parts (manufactured by Mitsui Petrochemical Industries, Ltd.) (manufactured by Sanyo Chemical Industries, Ltd.)

Condensed azo yellow "Chromophthal Yellow GR" (manufactured by Chiba Geigy) 45 parts The above three ingredients were processed in a manner similar to that described in Example 3 to obtain a master batch smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 15]

The procedure of Example 8 was repeated except that 10 parts of "Polypropylene wax 660P" were used instead of 33.3 parts of the 30% aqueous dispersion of a crystalline polypropylene-type resin emulsion to obtain a master batch. The process proceeded smoothly without causing breakage of strands or pulsating flows. Spinning was carried out as in Example 1. Breakage of threads due to clogging occurred.

[Comparative Example 16]

The three ingredients of the composition described in Example 8 were premixed, and an attempt was made for preparing a master batch in a manner similar to that described in Comparative Example 6. Since dehydration was insufficient, supply deficiency occurred to cause breakage of strands and pulsating flows. As a result, master batches could not be obtained.

[Example 9]

5% aqueous solution of polyoxyethylene glycerol borate—stearate, "Emalbon T-83" (manufactured by Toho Chemical Industry Co., Ltd.) 100 parts Polyethylene "NUC G5391" 55 parts Phthalocyanine Blue "Lionol Blue FG330" 40 parts The above three ingredients were processed in a manner similar to that described in Example 1 to obtain a master batch. A master batch was obtained smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 17]

The procedure of Example 9 was repeated except that 5 parts of a polypropylene wax, "Sunwax 131P" (composition by Sanyo Chemical Industries, Ltd.), were used instead of 100 parts of the 5% aqueous solution of "Emalbon T-83" to obtain a master batch. The process proceeded smoothly without causing breakage of strands or pulsating flows. Spinning was carried out as in Example 1. Breakage of threads due to clogging occurred.

[Comparative Example 18]

The three ingredients of the composition described in Example 9 were premixed, and an attempt was made for preparing a master batch in a manner similar to that described in Comparative Example 2. However, dehydration was insufficient, and thus supply deficiency occurred to cause breakage of strands and a pulsating flow. As a result, master batches could not be obtained.

[Example 10]

5% aqueous solution of a phosphoric ester of polyoxyethylene glycol ether, "Phosphanol RE960" (composition by Toho Chemical Industry Co., Ltd.) 100 parts Polyethylene "Mitsubishi Polyechi MV-31" 40 parts Polyethylene wax "Sunwax 165P" 15 parts Quinacridone Red "Fastgene Super Magenta RE03" 40 parts The above four ingredients were processed in a manner similar to that described in Example 1 to obtain a master batch smoothly without causing breakage of strands or pulsating flows. Spinning was carried out as an Example 1 to obtain polypropylene fibers. Good dispersibility was obtained without causing any problem in spinnability, generation of clogging, and stretching.

[Comparative Example 19]

The procedure of Example 10 was repeated except that 5 parts of metallic soap (calcium stearate) were used instead of 100 parts of the 5% aqueous solution of "Phosphanol RE960" to obtain a master batch. The process proceeded smoothly without causing breakage of strands or pulsating flows. Spinning was carried out as in Example 1. Breakage of threads due to clogging occurred.

[Comparative Example 20]

The four ingredients of the composition described in Example 10 were premixed, and an attempt was made for preparing a master batch in a manner similar to that described in Comparative Example 2. However, dehydration was insufficient, and thus supply deficiency occurred to cause breakage of strands and a pulsating flow. As a result, master batches could not be obtained.

[Example 11]

5% aqueous solution of side chain-modified methylpolysiloxane polyethylene oxide, "Silwet L-7602" (manufactured by Nippon Unicar) 100 parts Polypropylene "Mitsubishi Polypro (BC05B" (manufactured by Mitsubishi Petrochemical Co., Ltd., MFR: 50) 40 parts Phthalocyanine Blue "Lionol Blue 7110V" 30 parts Condensed azo yellow "Chromophthal Yellow GR" 10 parts Titanium oxide "Tipake CR-80" (manufactured by Ishihara Sangyo Kaisha, Ltd.) 5 parts The above five ingredients were processed in a manner similar to that described in Example 1 to obtain a master batch smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 21]

The procedure of Example 11 was repeated except that 5 parts of polypropylene wax "Viscol 550P" were used instead of 100 parts of the 5% aqueous solution of "Silwet L-7602" to obtain a master batch. The process proceeded smoothly without causing breakage of strands or pulsating flows. Spinning was carried out as in Example 1. Breakage of threads due to clogging occurred.

[Comparative Example 22]

The five ingredients of the composition described in Example 11 were used, and an attempt was made for preparing a master batch in a manner similar to that described in Comparative Example 6. However, dehydration was insufficient, and thus supply deficiency occurred to cause breakage of strands and a pulsating flow. As a result, master batches could not be obtained.

[Example 12]

5% aqueous solution of perfluoroalkyl phosphate "Surflon S-112" (manufactured by Asahi Glass Co., Ltd.) 100 parts Ethylene propylene copolymer resin "Mitsui Hipole J740P" 40 parts Ethylene vinyl acetate copolymer resin "Ultracene 680" (manufactured by Tosoh Corporation) 10 parts p1 Condensed azo yellow "Chromophthal Yellow GR" 40 parts Titanium oxide "Tipake CR-80" 5 parts The above five ingredients were processed in a manner similar to that described in Example 3 to obtain a master batch. A master batch was obtained smoothly without causing breakage of strands or pulsating flows. Spinning was carried out as in Example 1 to obtain polypropylene fibers. Good dispersibility was obtained without causing any problem in spinnability, generation of clogging, and stretching.

[Comparative Example 23]

The procedure of Example 12 was repeated except that 5 parts of sodium dodecylbenzene sulfonate were used instead of 100 parts of the 5% aqueous solution of "Surflon S-112" to obtain a master batch. The process proceeded smoothly without causing breakage of strands or pulsating flows. Spinning was carried out as in Example 1. Breakage of threads due to clogging occurred.

[Comparative Example 24]

The five ingredients of the composition described in Example 12 were used, and an attempt was made for preparing a master batch in a manner similar to that described in Comparative Example 6. Since dehydration was insufficient, supply deficiency occurred to cause breakage of strands and a pulsating flow. As a result, master batches could not be obtained.

The master batches obtained in Examples 1 to 12 and Comparative Examples 1, 3, 5, 7, 9, 11, 13, 15, 17, 19, 21, and 23 were evaluated in the following manner.

To evaluate the pigment dispersibility of the master batches, 10 parts of each master batch was mixed with 100 parts of polypropylene "Mitsui Nobrene J400" (MFR: 3), and 3 kg of the resulting mixture was extruded with a uniaxial extruder having a screw diameter of 30 mm and equipped with a 500 mesh metal net at the fore end. Increase in pressure at the fore end was compared. The results are shown in Table 1. Greater values indicate worse pigment dispersibility.

TABLE 1

| | Increase in pressure at the fore end of the extruder (kg/cm²) | | Increase in pressure at the fore end of the extruder (kg/cm²) |
|---|---|---|---|
| Ex. 1 | 12 | Ex. 7 | 6 |
| Comp. Ex. 1 | 65 | Comp. Ex. 13 | 57 |
| Ex. 2 | 9 | Ex. 8 | 13 |
| Comp. Ex. 3 | 57 | Comp. Ex. 15 | 80 |
| Ex. 3 | 8 | Ex. 9 | 10 |
| Comp. Ex. 5 | 53 | Comp. Ex. 17 | 63 |
| Ex. 4 | 11 | Ex. 10 | 11 |
| Comp. Ex. 7 | 72 | Comp. Ex. 19 | 71 |
| Ex. 5 | 7 | Ex. 11 | 15 |
| Comp. Ex. 9 | 66 | Comp. Ex. 21 | 87 |
| Ex. 6 | 12 | Ex. 12 | 14 |
| Comp. Ex. 11 | 75 | Comp. Ex. 23 | 83 |

Ex.: Example
Comp. Ex.: Comparative Example

[Example 13]

Polyethylene "NUC G5391" (MFR: 50) 40 parts
Polyethylene wax "Hiwax 420P" (manufactured by Mitsui Petrochemical Industries, Ltd.) 20 parts
Condensed azo yellow "Chromophthal Yellow GR" 15 parts
Quinacridone Red "Fastgene Super Magenta RE03" 10 parts
Titanium oxide "Tipake CR-80" 10 parts
Carbon black "Mitsubishi Carbon MA-100" (manufactured by Mitsubishi Kasei Corp.) 5 parts
Tap water 40 parts The above seven ingredients were processed in a manner similar to that described in Example 1 to obtain a master batch smoothly without causing breakage of strands or pulsating flows. 100 parts of a polyethylene "Hizex 2100J" (Mitsui Petrochemical Industries, Ltd., MFR: 6.5) and 3 parts of the obtained master batch were mixed, and processed into a plate using an injection molding machine with a back pressure of 0 kg/cm².

[Comparative Example 25]

Procedure of Example 13 was repeated except that a half (10 parts) of the polyethylene wax, "Hiwax 420P" was replaced by calcium stearate, and tap water was eliminated to obtain a master batch. The process proceeded smoothly without causing breakage of strands or pulsating flows. Using the resulting master batch, plates were formed as in Example 13.

[Example 14]

ABS resin "Styrak 191F" (manufactured by Asahi Chemical Industry Co., Ltd., MFR: 55) 60 parts
Phthalocyanine Blue wet cake "Lionol Blue SM-P" (pigment concentration: 50.0%) 60 parts
Titanium oxide "Tipake CR-80" 10 parts
Ion exchange water 20 parts Using the above four ingredients, the procedure of Example 1 was repeated except that the temperature set for the twin screw extruder was changed to 200° C. to obtain a master batch smoothly without causing breakage of strands or pulsating flows. 100 parts of an ABS resin "JSR ABS10" (manufactured by Japan Synthetic Rubber Co., Ltd., MFR: 0.5) and 3 parts of the obtained master batch were mixed, and processed into a plate as in Example 13.

[Comparative Example 26]

The procedure of Example 14 was repeated except that 30 parts of Phthalocyanine Blue "Lionol Bleu POBS" were used instead of the 60 parts of Phthalocyanine Blue wet cake "Lionol Blue SM-P" and ion exchange water was eliminated to obtain a master batch. The process proceeded smoothly without causing breakage of strands or pulsating flows. Using the resulting master batch, plates were formed as in Example 14.

[Example 15]

Aqueous resin dispersion obtained in Preparation Example 3 25.1 parts
Polyethylene "Mitsubishi Polyechi MV31" (MFR: 45) 20 parts
Polyethylene wax "Sunwax 165P" 15 parts
Titanium oxide "Tipake CR-80" 45 parts
Carbon black "Mitsubishi Carbon MA-100" 5 parts The above five ingredients were processed in a manner similar to that described in Example 1 to obtain a master batch. A master batch was obtained smoothly without causing breakage of strands or pulsating flows. Using the resulting master batch, plates were formed as in Example 13.

[Comparative Example 27]

The procedure of Example 15 was repeated except that 15 parts of metallic soap (calcium stearate) were used instead of the 25.1 parts of aqueous resin dispersion obtained in Preparation Example 3 to obtain a master batch. The process proceeded smoothly without causing breakage of strands or pulsating flows. Using the resulting master batch, plates were formed as in Example 13.

[Example 16]

Aqueous resin dispersion obtained in Preparation Example 4 67.3 parts
Polyethylene "NUC G5391" (MFR: 50) 20 parts
Polyethylene wax "Hiwax 420P" 10 parts
Condensed azo yellow "Chromophthal yellow GR" 15 parts
Quinacridone Red "Fastgene Super Magenta RE03" 20 parts
Titanium oxide "Tipake CR-80" 10 parts
Carbon black "Mitsubishi Carbon MA-100" 5 parts The above seven ingredients were processed in a manner similar to that described in Example 1 to obtain a master batch smoothly without causing breakage of strands or pulsating flows. Using the resulting master batch, plates were formed as in Example 13.

[Comparative Example 28]

The procedure of Example 16 was repeated except that 20 parts of an resin prepared before the aqueous treatment in Preparation Example 4 were used instead of the 67.3 parts of aqueous resin dispersion obtained in Preparation Example 4 to obtain a master batch. The process proceeded smoothly without causing breakage of strands or pulsating flows. Using the resulting master batch, plates were formed as in Example 13.

[Example 17]

10% aqueous solution of phosphoric ester of polyoxyethylene glycol ester "Phosphanol RL210" (manufactured by Toho Chemical Industry Co., Ltd.) 20 parts 10% aqueous solution of glycerol borate—hydroxystearate "Emalbon S-260" 30 parts Polypropylene "Chissopolypro K7050" (manufactured by Chisso Corporation, MFR: 45) 35 parts Propylene ethylene copolymer resin "APAO RT 2280" (manufactured by Ube Rexene, MFR: 250) 10 parts Condensed azo yellow "Chromophthal Yellow GR" 20 parts Quinacridone Red wet cake "Fastgene Super Magenta RE03" (pigment concentration: 50%) (Dainippon Ink and Chemicals, Inc.) 40 parts Titanium oxide "Tipake CR-80" 5 parts Carbon black "Mitsubishi Carbon MA-100" 5 parts The above eight ingredients were processed in a manner similar to that described in Example 3 to obtain a master batch smoothly without causing breakage of strands or pulsating flows. 100 parts of a polypropylene "Mitsui Nobrene JH-G" (Mitsui Petrochemical Industries, Ltd., MFR: 4) and 3 parts of the obtained master batch were mixed, and processed into a plate using an injection molding machine with a back pressure of 0 kg/cm$^2$.

[Comparative Example 29]

The procedure of Example 17 was repeated except that 5 parts of sodium lauryl sulfate "Emal 0" (manufactured by Kao Corporation) were used instead of the 20 parts of 10% aqueous resin solution "Phosphanol RL210" and 30 parts of 10% aqueous solution of "Emalbon S-260", and 30 parts of Quinacridone Red "Fastgene Super Magenta RE03" were used instead of 60 parts of Quinacridone Red wet cake "Fastgene Super Magenta RE03" to obtain a master batch. The process proceeded smoothly without causing breakage of strands or pulsating flows. Using the resulting master batch, plates were formed as in Example 17.

[Example 18]

10% aqueous dispersion of an oligomer containing perfluoroalkyl group and a hydrophilic groups "EFTOP EF-122C" (manufactured by Mitsubishi Metal Corporation) 50 parts ABS resin "JSR ABS35" (manufactured by Japan Synthetic Rubber Co., Ltd., MFR: 0.5) 40 parts Phthalocyanine Blue "Lionol Blue POBS" (manufactured by Toyo Ink Mfg. Co., Ltd.) 5 parts Titanium oxide "Tipake CR-80" 10 parts The above four ingredients were processed in a manner similar to that described in Example 14 to obtain a master batch smoothly without causing breakage of strands or pulsating flows. Using the resulting master batch, plates were formed as in Example 14.

[Comparative Example 30]

The procedure of Example 18 was repeated except that 5 parts of polystyrene wax "Himer ST95" (manufactured by Sanyo Chemical Industries, Ltd.) were used instead of the 50 parts of 10% aqueous dispersion of "EFTOP EF-122C" to obtain a master batch. The process proceeded smoothly without causing breakage of strands or pulsating flows. Using the resulting master batch, plates were formed as in Example 14.

The plates obtained in Examples 13–18 and Comparative Examples 25–30 were evaluated in terms of the mechanical strength, surface color unevenness, and pigment dispersibility, and the results are shown in Tables 2 and 3 along with the productivity of master batches.

TABLE 2

Retention Ratio (%) of Mechanical properties[*]

| | Tensile Strength | Flexural Modulus | Bending Strength | Izod Impact Test | Heat Deformation Temp. |
|---|---|---|---|---|---|
| Ex. 13 | A | A | A | A | A |
| Comp. Ex. 25 | B | B | B | A | C |
| Ex. 14 | A | A | A | A | A |
| Comp. Ex. 26 | B | B | B | A | C |
| Ex. 15 | A | A | A | A | A |
| Comp. Ex. 27 | C | B | A | A | C |
| Ex. 16 | B | A | A | A | A |
| Comp. Ex. 28 | C | B | B | A | B |
| Ex. 17 | A | A | A | A | A |
| Comp. Ex. 29 | B | B | A | A | C |
| Ex. 18 | A | A | A | A | A |
| Comp. Ex. 30 | C | B | B | A | B |

[*]Retention ratio of mechanical properties of a resin colored by a master batch based on the mechanical properties of a non-colored resin (100%).
A: not less than 96%
B: 90–96%
C: not more than 90%

TABLE 3

| | Color Shading of a Processed Product[*2] | Pigment Dispersibility[*3] | Productivity of a Master Batch[*4] |
|---|---|---|---|
| Ex. 13 | A | 5 | A |
| Comp. Ex. 25 | B | 2 | C |
| Ex. 14 | A | 5 | A |
| Comp. Ex. 26 | B | 2 | C |
| Ex. 15 | A | 5 | A |
| Comp. Ex. 27 | B | 1 | C |
| Ex. 16 | B | 5 | C |
| Comp. Ex. 28 | C | 2 | C |
| Ex. 17 | B | 4 | A |
| Comp. Ex. 29 | C | 1 | C |
| Ex. 18 | A | 4 | A |
| Comp. Ex. 30 | C | 1 | C |

[*2]Color unevenness of the surfaces of processed plates was visually evaluated.
A: No color unevenness
B: Slight color unevenness
C: Considerable color unevenness
[*3]A part of each processed plate was pressed using a pressing machine at 170° C., obtaining a film having a thickness of 0.1 mm. The film was magnified using a microscope, and the size and number of coarse pigment particles were measured with an image processor "Luzex 450" (manufactured by Toyo Ink Mfg. Co., Ltd.)
5: Particles having a size of not more than 50 u = Not more than $1.0 \times 10^3/cm^2$
4: Particles having a size of not more than 50 u = $1.0 \times 10^3 - 7.0 \times 10^3/cm^2$
3: Particles having a size of not more than 50 u = $7.0 \times 10^3 - 2.7 \times 10^4/cm^2$
2: Particles having a size of not more than 50 u = $2.7 \times 10^4 - 7.0 \times 10^4/cm^2$
1: Particles having a size of not more than 50 u = Not less than $7.0 \times 10^4/cm^2$
[*4]Productivity of a master batch manufactured with an extruder having a screw diameter of 65 mm.
A: Good
C: Bad

EFFECT OF THE INVENTION

According to the present invention, a highly dispersible resin composition for coloring can be manufactured by a process which does not include a conventional step using a three roll mill, and which has characteristics in that steps are simplified, labor is reduced, and working environment does not cause pigment scattering.

We claim:

1. A process for preparing a resin composition for coloring a thermoplastic resin, comprising the steps of:

supplying into a twin screw extruder 0.01% to 90% by weight of a pigment (a), 1% to 80% by weight of water (b), 1% to 90% by weight of a thermoplastic resin (c) having a melt flow rate (MFR) of 0.1–400 g/10 min. as calculated as the mass (gram) of the sample extruded from a plastometer in 10 minutes at an appropriate temperature and under an appropriate exerting load, and 0.01% to 80% by weight of an aqueous compound (e) composed of at least one compound selected from the group consisting of (i) ester compounds derived from boric acid and an alcohol, (ii) organic silicon compounds having a hydrophilic group, which are selected from the group consisting of polyalkylene oxide-adduct compounds of methylpolysiloxane, acid-neutralized products of amino-modified methylpolysiloxane, and base-neutralized products of acid-modified methylpolysiloxane, and (iii) organic fluorine-containing compounds having fluoroalkyl group and anionic-, cationic-, amphoteric-, or nonionic-hydrophilic group, based on the weight of said resin composition, each screw of said twin screw extruded rotating in the same direction and having an L/D value of 25 or higher; and subjecting the resulting mixture in said twin screw extruder to phase replacement and dehydration using said twin screw extruder.

2. The process for preparing a resin composition for coloring according to claim 1, in which the pigment (a) is a dry powdery pigment.

3. The process for preparing a resin composition for coloring according to claim 1, in which the pigment (a) is a pigment wet cake which contains water (c) in advance and which has not undergone a drying process.

4. The process for preparing a resin composition for coloring according to claim 3, in which the amount of the water (c) in the pigment wet cake is from 1 to 80% by weight.

5. The process for preparing a resin composition for coloring according to claim 1, in which the pigment (a) is a mixture of a dry powdery pigment and a pigment wet cake which contains water (c) in advance and which has not undergone a drying process.

6. The process for preparing a resin composition for coloring according to claim 5, in which the amount of water contained in the mixture of the dry powdery pigment and the pigment wet cake is 1 to 80% by weight.

7. The process for preparing a resin composition for coloring according to claim 1, in which the aqueous compound (e) has a surface activity.

8. The process for preparing a resin composition for coloring according to claim 1, in which the solid content of the aqueous compound (e) is from 0.01 to 80% by weight.

9. A resin composition for coloring a thermoplastic resin, said resin composition being comprised of a phase-replaced and dehydrated product of a mixture comprising, based on the weight of said resin composition;

0.01% to 90% by weight of a pigment (a);

1% to 80% by weight of water (b);

1% to 90% by weight of a thermoplastic resin (c) having a melt flow rate (MFR) of 0.1–400 g/10 min. as calculated as the mass (gram) of the sample extruded from a plastometer in 10 minutes at an appropriate temperature and under an appropriate exerting load; and 0.01% to 80% by weight of an aqueous compound (e) composed of at least one compound selected from the group consisting of (i) ester compounds derived from boric acid and an alcohol, (ii) organic silicon compounds having a hydrophilic group, which are selected from the group consisting of polyalkylene oxide-adduct compounds of methylpolysiloxane, acid-neutralized products of amino-modified methylpolysiloxane, and base-neutralized products of acid-modified methylpolysilonxane, and (iii) organic fluorine-containing compounds having fluoroalkyl group and anionic-, cationic-, amphoteric-, or nonionic-hydrophilic group;

wherein said phase-replaced and dehydrated product and said mixture are obtained using a twin screw extruder, each screw of said twin screw extruder rotating in the same direction and having an L/D value of 25 or higher.

10. A resin composition according to claim 9, having a dispersability in a thermoplastic resin, such that a thermoplastic host resin colored with said resin composition has a value at least 96% of the value of each of tensile strength, flexural modulus, bending strength, and Izod impact of a non-colored thermoplastic host resin as measured when said colored thermoplastic host resin is produced by injection molding using 3% by weight of said resin composition based on the weight of said thermoplastic host resin.

* * * * *

UNITED STATES PATENT AND TRADEMARK OFFICE
CERTIFICATE OF CORRECTION

PATENT NO. : 5,872,164
DATED : February 16, 1999
INVENTOR(S) : Masashi Koide, Yasuaki Machida and Junichi Suzuki It is certified that error appears in the above-identified patent and that said Letters Patent is hereby corrected as shown below:

On the title page: Item [56] References Cited, FOREIGN PATENT DOCUMENTS, delete "1126139   11/1984   Japan" and insert --61-126139   11/1984   Japan--.

Signed and Sealed this

Thirteenth Day of July, 1999

Attest:

*Attesting Officer*

Q. TODD DICKINSON

*Acting Commissioner of Patents and Trademarks*